United States Patent [19]
Kim

[11] Patent Number: 5,905,722
[45] Date of Patent: May 18, 1999

[54] CALL PROCESSING METHOD IN RADIO TELEPHONE USING SPREAD SPECTRUM COMMUNICATION SYSTEM

[75] Inventor: Geun-Bae Kim, Suwon, Rep. of Korea

[73] Assignee: Samsung Electronics Co., Ltd., Rep. of Korea

[21] Appl. No.: 08/772,565

[22] Filed: Dec. 26, 1996

[30] Foreign Application Priority Data

Dec. 30, 1995 [KR] Rep. of Korea ............... 95-67761

[51] Int. Cl.⁶ ........................................... H04J 13/04
[52] U.S. Cl. ............................... 370/342; 375/206
[58] Field of Search ............................ 370/280, 321, 370/335, 342, 347, 479; 375/200, 206, 208; 455/422, 458, 462, 463

[56] References Cited

U.S. PATENT DOCUMENTS

| | | | |
|---|---|---|---|
| 5,325,420 | 6/1994 | Kikuchi ........................... | 455/463 |
| 5,594,776 | 1/1997 | Dent ................................ | 455/458 |
| 5,604,732 | 2/1997 | Kim et al. ...................... | 370/342 |
| 5,689,525 | 11/1997 | Takeishi et al. ............... | 370/342 |
| 5,689,549 | 11/1997 | Bertocci et al. ............... | 455/463 |

*Primary Examiner*—Chi H. Pham
*Assistant Examiner*—Maikhanh Tran
*Attorney, Agent, or Firm*—Dilworth & Barrese

[57] ABSTRACT

A call processing method in a radio telephone, in which receiving and transmitting operations are carried out using a spread spectrum communication system in accordance with a time division duplexing, the radio telephone including a base set wire-connected to a public switching network and a plurality of handsets radio-connected to the base set and allocated with different pseudo noise codes, respectively. The method includes the steps of transmitting a ring-on message to all the handsets in every transmitting operation of the base set, once the radio telephone receives an incoming call from the public switching network, while encoding the ring-on message with the pseudo noise codes, sequentially checking whether or not a signal responding to the transmitted ring-on message is received at the base set, in every receiving operation of the base set, while replacing the pseudo noise codes one by one at a predetermined time interval, if it is determined that a signal responding to the transmitted ring-on message is received from one of the handsets, then establishing a channel between the base set and the handset transmitting the response signal, and transmitting a ring-off message to the remaining handsets while encoding the ring-off message with the pseudo noise codes respectively allocated to the remaining handsets, thereby cutting off an establishment of channels.

8 Claims, 5 Drawing Sheets

CALL PROCESSING METHOD IN RADIO TELEPHONE USING SPREAD SPECTRUM COMMUNICATION SYSTEM

BACKGROUND OF THE INVENTION

1. Field of the Invention

The present invention relates to a radio telephone in which receiving and transmitting operations are carried out using a spread spectrum communication system in accordance with a time division duplexing. More particularly, the invention relates to a call processing method in a radio telephone capable of sending a ring signal from the base set of the radio telephone to all handsets when the base set receives an incoming call, and then establishing a communication channel between the base set and the handset transmitting a signal responding to the ring signal.

2. Description of the Related Art

The spread spectrum communication system is the system which has been long used for military communications. This system has a high resistance to jamming or interference and a superior privacy function. In such a spread spectrum system, information is transmitted while its bandwidth is spread out using a pseudo noise (PN) code with a bandwidth considerably wider than that of the information. For example, voice signals generally occupy a bandwidth less than 20 kHz wide. In a spread spectrum system, signals representing the voice information may be spread out over a bandwidth spanning several MHz or more. In receiving, information is decoded by using the same PN code as that used in the transmission. In this way, reception of only the desired information is achieved.

One type of diffused band system is known as code division multiple access (CDMA), in which different PN codes are respectively allocated to different users. As a result, the users can be distinguished from one another, such that multiple users can be simultaneously connected using the same frequency band. Recently, CDMA has been advanced to digital mobile communication systems of cellular telephone networks.

A CDMA technique may be used in operating a radio telephone consisting of a base set and a plurality of handsets radio linked to the base set. For example, this type of radio telephone may be used in the home or office, where the base set is connected to a telephone line of a wire-line telephone network. In order to apply the CDMA technique to such a multi-handset operation, it is necessary to allocate a different PN code to each handset thereby distinguishing the handsets from one another. The base set may be equipped with an equal number of transmitting units and receiving units, both corresponding in number to the handsets. Since the receiving units include synchronization circuits, their configurations are considerably more complex than the transmitting units. For this reason, the configuration requiring as many receiving units as there are handsets, is undesirable.

Meanwhile, the base set may be connected to the handsets via only one channel because there is only one central office line connected to a switching system in most radio telephones. In other words, the base set may communicate with all handsets in a one-to-one communication fashion using only a single transmitting unit while performing a change in PN code in accordance with the handsets. However, where an externally generated incoming call is received, it is necessary for the base set to send a ring signal to all handsets.

SUMMARY OF THE INVENTION

Therefore, an object of the invention is to provide a call processing method in a radio telephone including a base set and a plurality of handsets while having the same base set configuration as that of a radio telephone having one base set and one handset, by using a spread spectrum communication system, involving sending a ring signal to either all the handsets or a particular one of the handsets when an incoming call is received.

Another object of the invention is to provide a call processing method in a radio telephone, in which receiving and transmitting operations are carried out using a spread spectrum communication system in accordance with a time division duplexing, capable of sending a ring signal from the base set of the radio telephone to all handsets when the base set receives an incoming call, and then establishing a channel between the base set and the handset transmitting a signal responding to the ring signal.

Another object of the invention is to provide a call processing method in a radio telephone, in which receiving and transmitting operations are carried out using a spread spectrum communication system in accordance with a time division duplexing, involving sending a ring-on message from the base set of the radio telephone to all handsets in response to an incoming call received from a public switching network in a transmitting operation of the base set, checking which handset sends a signal responding to the ring-on message to the base set in a receiving operation of the base set, and then establishing a channel between the base set and the identified handset while transmitting a ring-off message to the remaining handsets, thereby cutting off an establishment of channels to the remaining handsets.

Another object of the invention is to provide a call processing method in a radio telephone, in which receiving and transmitting operations are carried out using a spread spectrum communication system in accordance with a time division duplexing, involving establishing a channel between the base set of the radio telephone and a desired one of handsets when the base set receives an incoming call, while transmitting information, indicative of the fact that the base set is busy, to the remaining handsets until the call service of the base set is completed.

In order to accomplish these objects, the present invention provides a call processing method in a radio telephone, in which receiving and transmitting operations are carried out using a spread spectrum communication system in accordance with a time division duplexing, the radio telephone including a base set wire-connected to a public switching network and a plurality of handsets radio-connected to the base set, comprising the steps of: transmitting a ring-on message to all the handsets in a transmitting operation of the base set when the radio telephone receives an incoming call from the public switching network; sequentially checking all the handsets in a receiving operation of the base set, thereby checking whether or not a signal responding to the transmitted ring-on message is received at the base set; repetitively executing the above two steps until it is determined that a signal responding to the transmitted ring-on message is received from one of the handsets, and then establishing a channel between the base set and the handset transmitting the response signal while transmitting a ring-off message to the remaining handsets, thereby cutting off an establishment of channels associated with the remaining handsets.

The base set of the radio telephone executing the above operation is characterized in that it includes a plurality of transmitting parts and one receiving part. The number of the transmitting parts corresponds to the number of the handsets radio-connected to the base set.

BRIEF DESCRIPTION OF THE DRAWINGS

Other objects and aspects of the invention will become apparent from the following description of embodiments with reference to the accompanying drawings in which.

DETAILED DESCRIPTION OF THE PREFERRED EMBODIMENTS

In the following description of the present invention, a detailed description of known functions and configurations incorporated herein will be omitted when it may make the subject matter of the present invention rather unclear. Also, the terms used in the following description are terms defined taking into consideration the functions obtained in accordance with the present invention. The definitions of these terms should be determined based on the whole content of this specification because it may be changed in accordance with the option of a chip designer or a usual practice.

Figure 1:
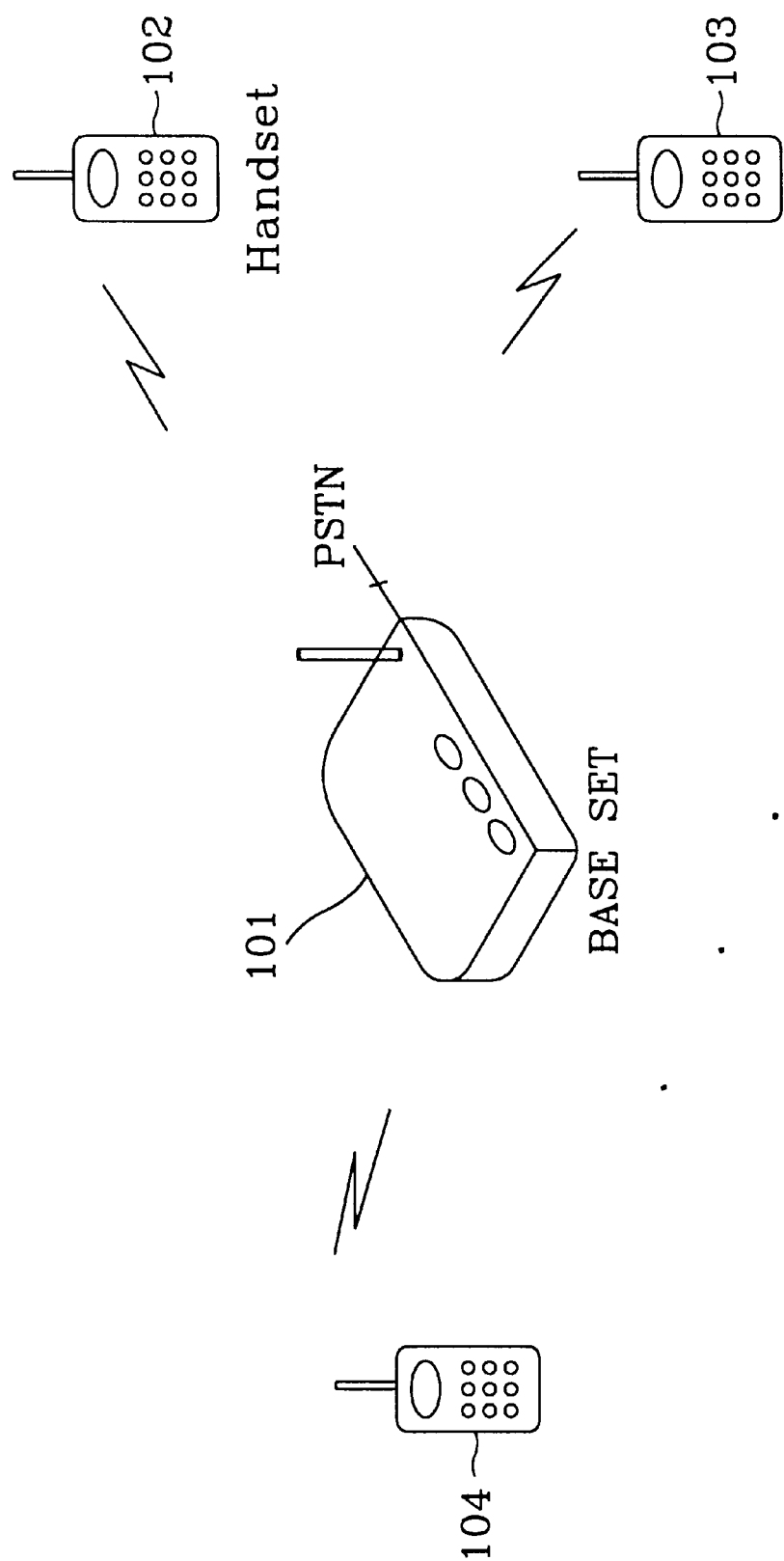
FIG. 1 is a view schematically illustrating a radio telephone utilizing spread spectrum communications to which the present invention is applied, the radio telephone including a base set and a plurality of handsets connected to the base set.

FIG. 1 is a view schematically illustrating a radio telephone utilizing spread spectrum communications to which the present invention is applied. As shown in FIG. 1, the radio telephone includes a base set 101 and a plurality of handsets 102 to 104. The base set 101 has a transmitting unit and a receiving unit respectively having configurations shown in FIG. 2.

Figure 2:
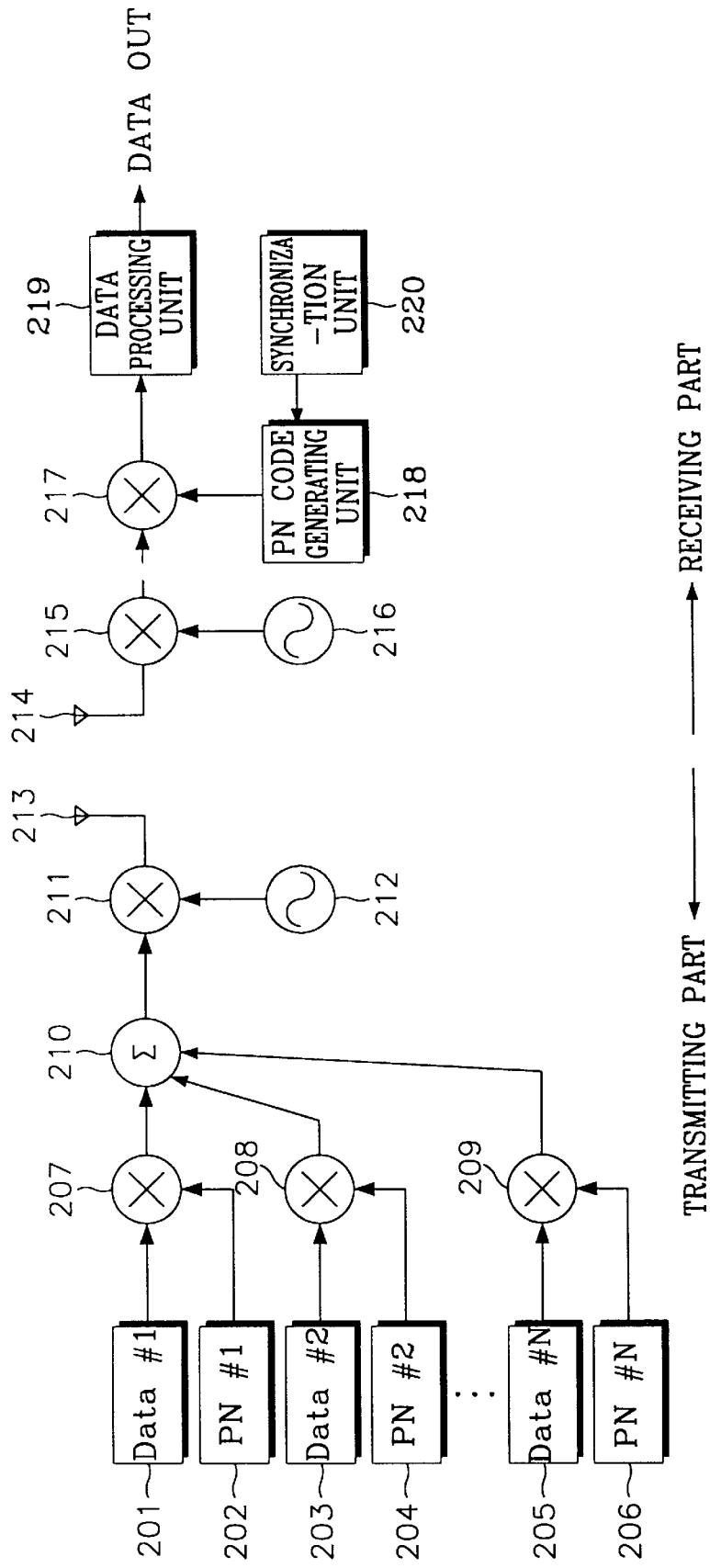
FIG. 2 is a block diagram illustrating a concrete configuration of the base set shown in FIG. 1.

Referring to FIGS. 1 and 2, the transmitting unit of the base set 101 includes a plurality of multipliers respectively corresponding to the handsets. Each multiplier serves to multiply data to be sent to the handset corresponding to the multiplier by a PN code allocated to the corresponding handset. In FIG. 2, only three multipliers, namely, the first multiplier 207, the second multiplier 208 and the N-th multiplier 209, are shown. The first multiplier 207 multiplies data 201 to be sent to the first handset 102 by a PN code 202 allocated to the first handset 102. The second multiplier 208 multiplies data 203 to be sent to the second handset 103 by a PN code 204 allocated to the second handset 103. The N-th multiplier 209 multiplies data 205 to be sent to the N-th handset 104 by a PN code 206 allocated to the N-th handset 104. The transmitting unit of the base set 101 also includes an adder 210 for adding output signals from all the multipliers, a mixer 211 for mixing an output from the adder 210 with a carrier generated from an oscillator 212, and an antenna 213 for radiating the output from mixer 211.

The receiving unit of base set 101 includes a mixer 215 for mixing a signal received from an antenna 214 with a carrier generated from an oscillator 216, a synchronization unit 220 for executing a synchronization acquisition and tracking, a PN code generating unit 218 for generating a PN code, and a data processing unit 219 for detecting data using a correlator or matched filter 217.

Figure 3:
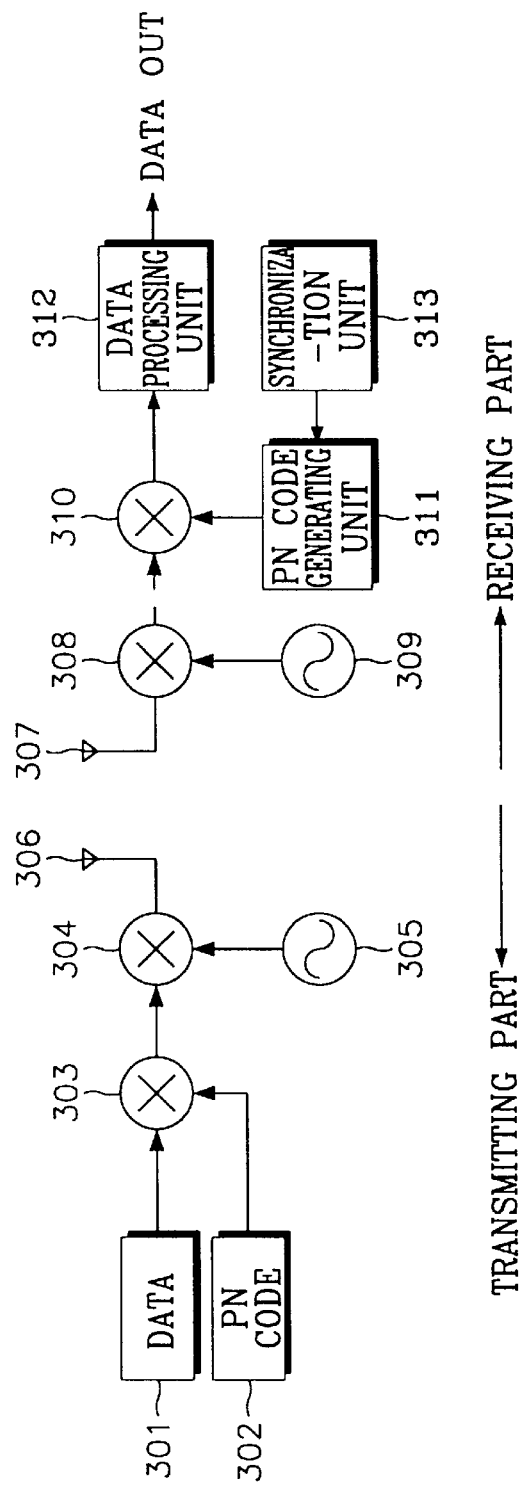
FIG. 3 is a block diagram illustrating a concrete configuration of each handset shown in FIG. 1.

FIG. 3 is a block diagram illustrating transmitting and receiving units of each handset. The transmitting unit of each handset has the same configuration as the transmitting unit of the base set 101 which is configured to include only one adder. That is, data 301 is encoded by means of a multiplier 303 multiplying a PN code generated by PN code unit 302 with the data. A mixer 304 then mixes the encoded data with a carrier generated by an oscillator 305, and antenna 306 radiates the output of the mixer. Likewise, the receiving unit of each handset has the same configuration as the receiving unit of the base set 101. As such, components 307–313 perform analogous functions as components 214–220, respectively, of the base set.

Figure 4:
FIG. 4 is a diagram illustrating operations of the base set of the present invention, executed in response to an incoming call received at the base set at respective transmitting and receiving timings.

FIG. 4 is a diagram illustrating an operation of the base set 101 executed in response to an external call, namely, an incoming call received from a public switching network, in order to inform all handsets 102, 103, 104 of the receiving of the incoming call. This operation is carried out at respective transmitting and receiving timings.

Figure 5A:
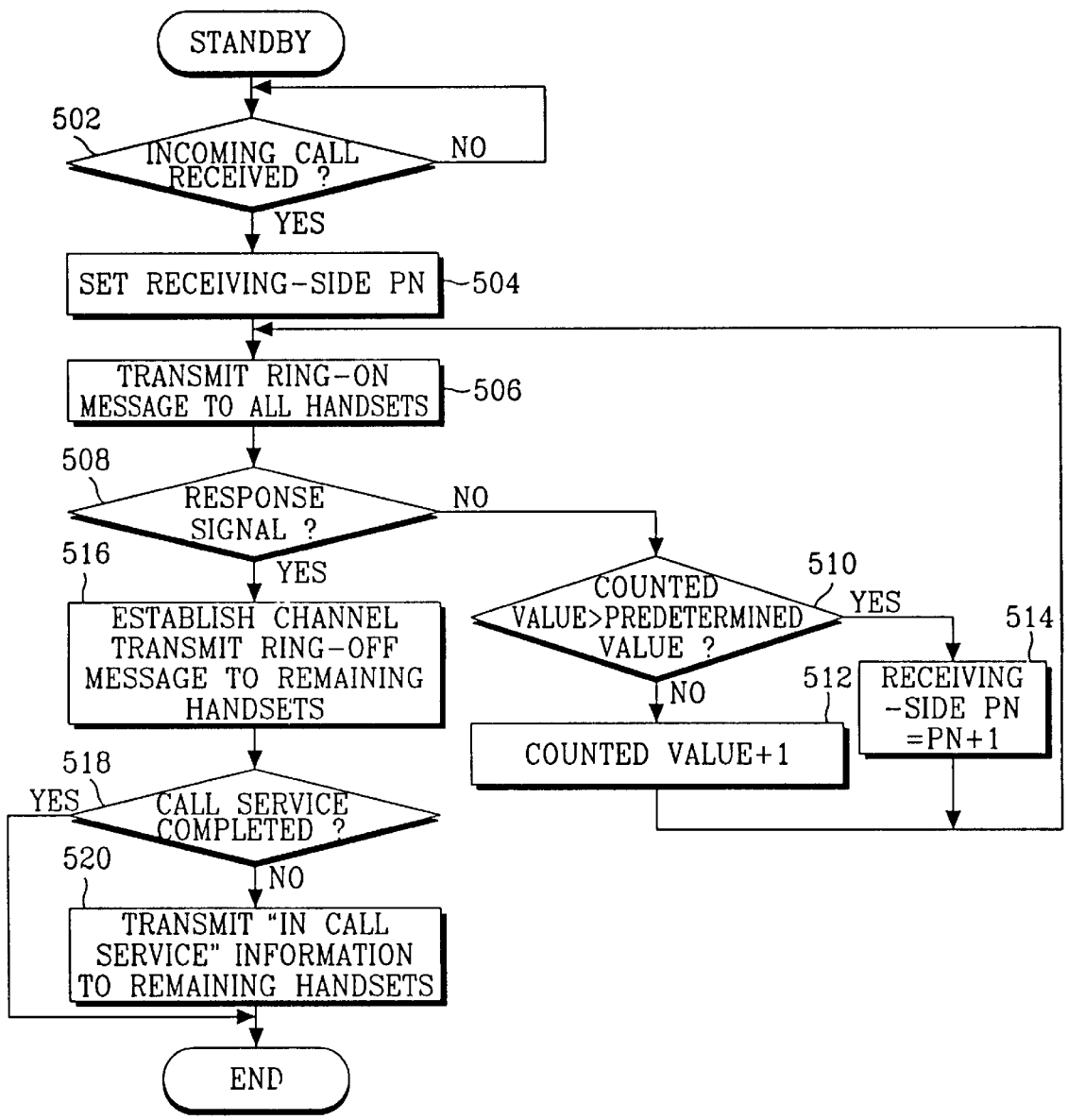
FIGS. 5A and 5B are flow charts illustrating a call processing procedure executed in the base set and handsets in accordance with the present invention.
Figure 5B:
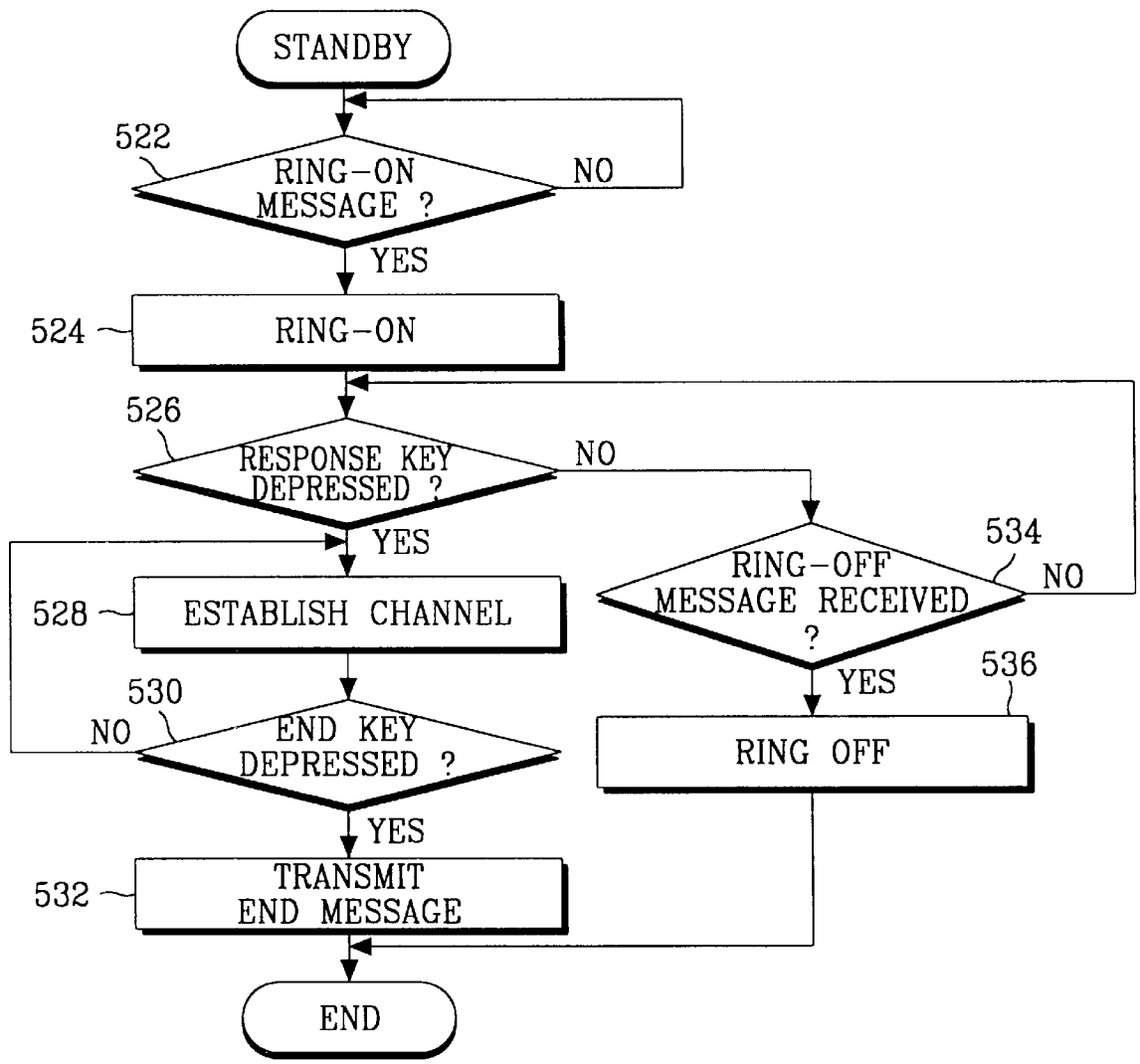

FIG. 5 is a flow chart illustrating a call processing procedure executed in accordance with the present invention. FIG. 5A shows a call processing operation of the base set 101 whereas FIG. 5B is a call processing operation of each handset.

A call processing procedure in accordance with the present invention, executed when an incoming call is received, will now be described in conjunction with FIGS. 1 to 5.

When the base set 101 receives an incoming call, it sends data 201, 203 and 205 to all the handsets 102, 103 and 104 during a first transmit time slot, while carrying a ring-on message in all the data and multiplying (encoding) the ring-on message with PN codes 202, 204 and 206. Referring to FIG. 4, this first transmit time slot is denoted TX1, which is the first time slot of 2 N timeslots in a first timing interval designated as "PN #1". At a first receive time slot RX1 of time interval PN #1, the base set 101 performs an operation of receiving data from the handsets while using the PN code 202 (also referred to as PN #1) allocated to the first handset 102 as a despreading code to decode only the response signal (if any) radiated by the first handset. When the base set 101 detects no response signal from the first handset, it sends again the ring-on message to all the handsets at a second transmit slot TX2 of the first time interval. During a second receive slot RX2, the base set 101 performs a detection of data while again decoding the received data with the PN code 202 allocated to the first handset 102. Based on the result of the detection, the base set 101 determines whether or not a response to the ring-on message is made. Where there is no code recognized as the first handset 102 even after the above operations are repeated a predetermined number N times (which may be different from the number of handsets) the base set 101 then replaces the PN code used in the receiving unit with the PN code 204 allocated to the second handset 103. At this time, a second time interval designated as "PN #2" begins. During the first transmit slot TX1 of interval PN #2, the base set 101 sends the ring-on message to all the handsets, and then performs a detection of received data at a following receive slot RX1. After analyzing the detected data, the base set 101 determines whether or not a response to the ring-on message is made from the second handset 103. If no response is made, then the base set 101 sends again the ring-on message to all the handsets at a next transmit slot TX2 of the interval PN #2. At a following receive time slot RX2, timing, the base set 101 determines whether or not a response is made. If there is no response from the second handset 103 even after the above operations are repeated N times, the base set 101 then replaces the receiving-side PN code with the PN code allocated to the third handset. The base set 101 then repetitively executes the transmitting and receiving operations during the time interval designated as PN #3. The above procedure is repeated until a response to the ring-on message is detected by the base set 101 while sequentially replacing the receiving-side PN code with a new one in the above-mentioned manner.

Meanwhile, each handset despreads signals received from the base set 101 using the PN code allocated thereto, thereby extracting only the received data intended for that handset. When the handset detects a ring-on message sent from the base set 101, it rings. Then, the handset waits while ringing continuously or periodically until it receives a ring-off message from the base set 101.

When a user, who recognizes the ringing, responds to the call by depressing an appropriate key on an optional one of ringing handsets, for example, the N-th handset, this handset immediately sends a response signal to the base set 101. The base set 101, which is waiting for a response to its ring-on message while continuously replacing the receiving-side PN code with a new one, can detect the response signal from the N-th handset during a time slot when it executes a receiving operation using the PN code allocated to the N-th handset. When the response signal is detected, the transmitting unit of the base set 101 sends a ring-off message to the remaining handsets, which message is carried in all the data except for the N-th data. Also, the PN code, which is used in the receiving unit, is no longer replaced with a new one. This allows the N-th data 206 to be sent to the N-th handset, carrying speech data therein. Thus, a call service is carried out.

In the process of the call service, the base set 101 periodically transmits, at predetermined intervals, information to the remaining handsets (other than the N-th handset) indicating that one of the handsets is presently in use. Any handset receiving this information responds by preventing a call attempt from that handset.

Where it is desired to send a ring signal to a particular handset, thereby allowing only that handset to take a call, the transmitting unit of the base set sends data associated with only the particular handset along with only the PN code allocated to that handset. In this case, the receiving unit of the base set executes a receiving operation using only the PN code allocated to the particular handset. For example, the base set 101 may be equipped with a keypad (not shown) which would allow a user to input a code identifying the particular handset to be activated.

FIG. 5A is a flow chart illustrating a software routine running within processing circuitry of the base set. If an incoming call is received in step 502, the receiving side PN code is set (step 504) and a ring-on message is caused to be transmitted to all the handsets (step 506) as discussed above. Next, it is determined whether a response signal is received from the first handset (step 508) and, if no response is received, the flow proceeds to step 510, where it is determined if a counted value exceeds a predetermined value. If not, the counted value is incremented by one in step 512 and the flow returns to step 506. If the predetermined value is exceeded in step 510, the receiving side PN code is incremented by one in step 514, so that the base set is then looking for a response from the next handset (second handset). The flow then returns to step 506 and the process repeated.

If, in step 508, a response signal has been received from a one of the handsets, then in step 516, a channel is established with that handset and a ring-off message is transmitted to the remaining handsets to cause the ringers of those handsets to shut off. If the call service is determined to be completed in step 518, the call is ended. Otherwise, "in call service" information is transmitted to the remaining handsets in step 520 to prevent those handsets from initiating a call.

FIG. 5B illustrates the operation at the handset. If a ring-on message is received in step 522, the handset is caused to ring in step 524. If the response key is depressed in step 526, a channel is established with the base set (step 528). Otherwise, the flow proceeds to step 534, and if a ring-off message is received, the ringer is turned off in step 536. If a channel is established in step 528, the next step is to determine whether the end key is depressed on the handset (step 530) and if not, the channel is maintained. When the end key is depressed, an "end" message is transmitted to the base set in step 532, whereupon the call is terminated.

As apparent from the above description, the present invention provides a call processing method which is applicable to a radio telephone using a spread spectrum communication system and including a base set consisting of one receiving part or unit and a plurality of transmitting parts or units. In accordance with the call processing method of the present invention, when the radio telephone receives an incoming call, the base set thereof is controlled to ring either all handsets or a particular one of the handsets. Accordingly, it is unnecessary for the base set to have receiving units corresponding in number to the handsets. This is advantageous in that the configuration of the base set is simplified.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A call processing method in a radio telephone, in which receiving and transmitting operations are carried out using a spread spectrum communication system, the radio telephone including a base set wire-connected to a public switching network and a plurality of handsets radio-linked to the base set and allocated with different pseudo noise codes, respectively, comprising the steps of:

(A) transmitting a ring-on message to each of the handsets in every transmitting operation of the base set, once the radio telephone receives an incoming call from the public switching network, each ring-on message being encoded with a respective one of the pseudo noise codes;

(B) sequentially checking whether or not a signal responding to the transmitted ring-on message is received at the base set, in every receiving operation of the base set, while replacing the pseudo noise codes one by one at a predetermined time interval; and (C) determining whether a response signal responding to the transmitted ring-on message is received from one of the handsets, then establishing a channel, if a response signal is received, between the base set and the handset transmitting the response signal, and transmitting a ring-off message to the remaining handsets while encoding the ring-off message with the pseudo noise codes respectively allocated to the remaining handsets, thereby cutting off an establishment of channels associated with the remaining handsets.

2. The call processing method in accordance with claim 1, further comprising the step of:

transmitting information indicative of the base set being in call service, to the remaining handsets in every transmitting operation of the base set after the establishment of the channel until the call service is completed.

3. A radiotelephone, comprising:

a base set adapted for connection to at least one telephone line of a telephone network, said base set including means for storing a plurality of pseudo-noise (PN) codes;

a plurality of handsets wirelessly linked to the base set, each handset having a different one of said PN codes stored within circuitry therein;

said base set including means for transmitting a ring-on message to all of the handsets when an incoming call is received from the telephone network, means for sequentially applying one of said PN codes one by one and checking whether a response signal from one of the handsets responding to the ring-on signal is received at the base set, and means for establishing a communication channel with a responsive one of said handsets, using the PN code allocated to the responsive handset.

4. The radiotelephone of claim 3, wherein the base set further includes means for periodically transmitting call-in-progress signals to remaining ones of the handsets, indicative of the base set being busy, each handset including means responsive to said call-in-progress signals to prevent a new call from being initiated thereat.

5. The radiotelephone of claim 3, wherein the base set includes a transmitting part having a plurality of multipliers, each for multiplying one of said PN codes with data to produce a plurality of encoded data signals, an adder for adding the plurality of encoded data signals, a mixer for mixing the adder output with a carrier signal of an oscillator and an antenna for radiating an output signal of the mixer.

6. The radiotelephone of claim 3, wherein the base set includes a receiving part having a synchronization unit coupled to a PN code generating unit, an antenna for receiving encoded data signals from any of the handsets, a mixer, a single oscillator, a multiplier and a data processing unit coupled to the telephone network, said mixer mixing the encoded data signal received by the antenna with a carrier signal from the oscillator to provide a mixer output signal, said multiplier multiplying said mixer output signal with a PN code provided by said PN code generating unit to decode the encoded data signal, the decoded signal being applied to the data processing unit for processing and transmission to the telephone network.

7. The radiotelephone of claim 3, wherein each handset comprises a transmitting part having a PN code generator, means for converting speech to data signals, a multiplier for encoding the data signals with a PN code produced by the PN code generator, a mixer for mixing the encoded data signal with a carrier signal and an antenna for radiating the mixer output.

8. The radiotelephone according to claim 3, wherein each handset comprises a mixer for mixing a received encoded signal from the base set with a carrier, a multiplier for multiplying the mixer output with a PN code generator to decode the encoded data signal, a synchronization unit coupled to the PN code generating unit and a data processing unit for processing the decoded data signal.

* * * * *